May 15, 1934.  G. T. SUGDEN  1,959,069
WINDSHIELD HEATING ATTACHMENT
Filed July 29, 1932
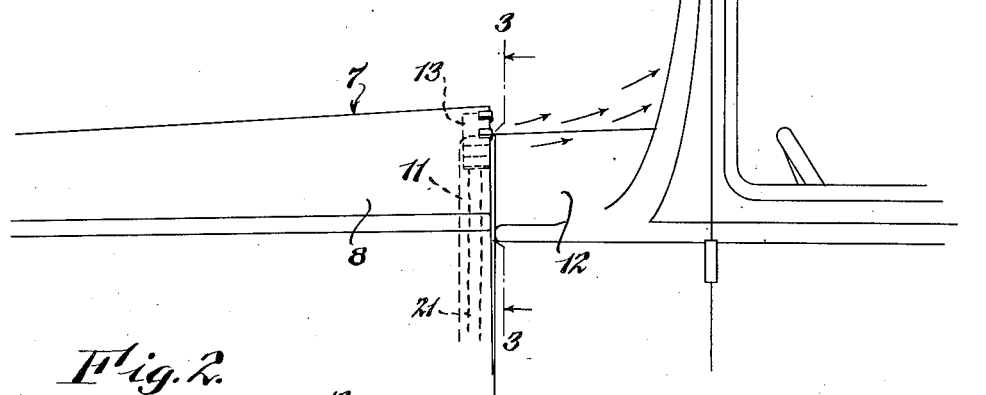
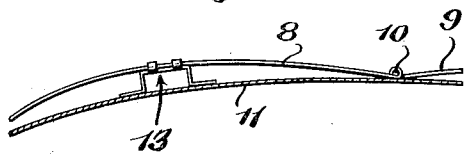
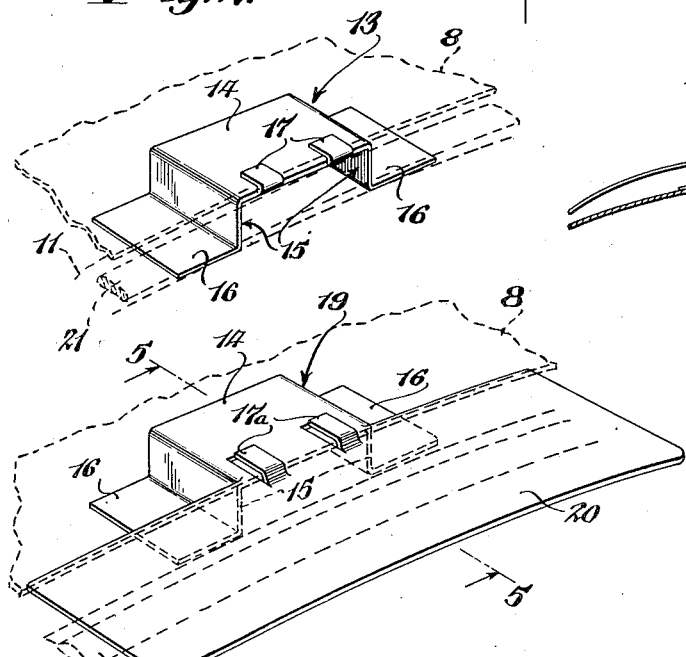
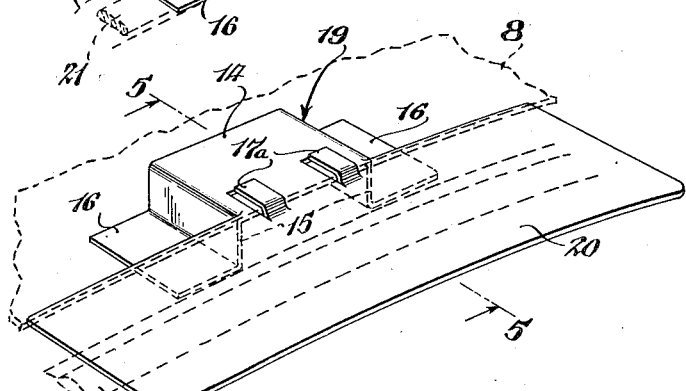
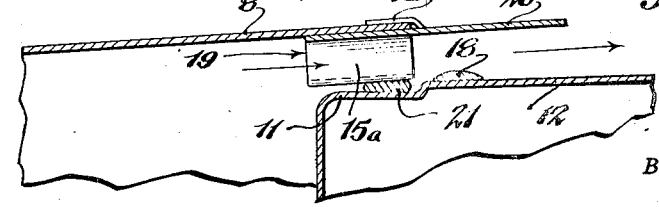
INVENTOR
Gilbert T. Sugden
BY Popp and Powers
ATTORNEYS Patented May 15, 1934

1,959,069

UNITED STATES PATENT OFFICE 1,959,069

WINDSHIELD HEATING ATTACHMENT

Gilbert T. Sugden, Lockport, N. Y.

Application July 29, 1932, Serial No. 625,923

2 Claims. (Cl. 20—40.5)

This invention relates to improvements in windshield heating attachments of the kind which co-operate with the hood of the automobile to direct warm air from the engine against the windshield whereby the accumulation thereon of frozen materials such as snow and sleet is prevented. Such frozen material can accumulate only when the temperature of the windshield is within a narrow range of several degrees, the material melting if the temperature is higher than this range and freezing before it reaches the windshield so that it will not adhere thereto if the temperature is lower than said range. The accumulation of frozen material, therefore, may if the temperature of the windshield is within the range referred to, be prevented by warming the latter only a few degrees.

One object of the invention is to provide a device which is attachable and detachable at will whereby it may be normally carried in a convenient part of the automobile and attached only at such times as weather conditions arise which necessitate its immediate use.

A further object is to provide a novel form and arrangement of attachment whereby the hood itself is utilized to direct the warm air against the windshield.

A still further object is to provide an attachment of the character described which is designed to prevent deflection of the warm air away from the windshield as it passes from beneath the hood.

The invention is illustrated in the accompanying drawing in which:

Figure 1 is a fragmentary view in elevation of an automobile to which is applied an attachment embodying features of the invention.

Figure 2 is an enlarged perspective view of the attachment, the associated parts of the vehicle being shown in dotted lines.

Figure 3 is an enlarged fragmentary section taken along line 3—3 of Figure 1.

Figure 4 is a perspective view of a modified form of the invention, the associated parts of the vehicle being shown in dotted lines.

Figure 5 is a fragmentary section taken along line 5—5 of Figure 4.

The device is illustrated in Figure 1 in connection with an automobile having a hood 7 of conventional construction. The latter, therefore, includes two hood sections 8 and 9 (see Figure 3) which are hingedly connected to a common connecting rod 10. The latter is supported at its front and rear ends by the radiator and vehicle body respectively in accordance with present practice. At its rear end, that is to say the end closest to the windshield, the terminal portions of the hood sections 8 and 9 are formed to fit conformably over a supporting ledge 11, the latter being a continuation of the cowl 12 of the vehicle body.

The invention contemplates the support, at times, of the rear ends of the hood sections at an elevation relative to their normal position so that air which is warmed by the engine may be directed against the windshield. This is accomplished, in the embodiment shown in Figures 1 to 3 inclusive, by a pair of elements 13, one of which is employed in connection with each of the hood sections. The elements are arranged upon the ledge 11 between the latter and the hood. Each element is preferably formed of sheet metal. In its formation it is provided with a raised body 14 and legs 15, the latter including laterally extending portions 16 which rest upon the ledge 11. The body is formed with fingers 17 which are formed to extend forwardly over and above the body portion.

The elements may be conveniently secured in operative position by first releasing the securing means at either side of the hood. Upon raising a hood section slightly an element may be detachably secured thereto by engaging the fingers 17 over the rear end of the said section. When thus arranged the body of the element extends beneath and is substantially entirely covered by the hood section. The latter is then lowered and the laterally extending portions 16 of the legs 15 are permitted to rest upon the adjacent part of the vehicle body which, in most cases, will be the ledge 11, it being preferred that the element, as shown, be attached to the hood section midway between the side margins of the top half of the section. When the elements have been arranged in this manner the hood may be secured upon them either by use of the conventional securing means or, if such means is not practical, by use of suitable auxiliary securing means. In the securement of the hood in the manner described the connecting rod 10 assumes a position which is, or is in the neighborhood of, its normal position, while the adjacent portions of the hood sections are bowed over the elements thereby providing passages through which air from within the hood may pass toward the windshield.

It will be apparent that the elements 13 serve merely to support the rear ends of the hood sections above the ledge upon which the said sections are normally secured, the hood sections themselves directing the warm air rearwardly against the windshield. The laterally extending portions of the legs 15 are adapted to prevent marring or injury to those parts of the vehicle upon which the element is supported.

From the foregoing it will be appreciated that the device may be quickly attached or detached as occasion may demand without the aid of tools. An advantage which is obtained, therefore, is that the hood may be secured in its normal position at all times except at such times as heating of the windshield is desirable.

Heretofore it has been the practice in some instances to provide a bead or rib about the cowl of the automobile for the purpose of decoration. Such a bead is indicated at 18 in Figures 4 and 5. As the bead extends across a portion of the path which is traversed by the warm air in its movement toward the windshield, a substantial portion of the air would, unless provision were made to guard against this, be deflected away from the windshield. In order to avoid this action of the bead, the element 19 is formed or provided with a rearwardly extending deflector 20. The latter extends over the bead 18 toward the windshield. Hence the air which is deflected upwardly by the bead is redirected toward the windshield by the rear end of the deflector. The projections 17a which are utilized in securing the element in position are suitably struck out of the material comprising the body and deflector portions of the element. The latter is attached and detached in substantially the same manner as the element shown in Figure 2.

It is the practice in order to avoid objectionable rattling of the hood to secure a felt strip 21 about the ledge 11 of the cowl, the hood being secured against the strip when in its normal position. In the embodiments illustrated the laterally extending portions 16 of the legs rest upon this strip. By virtue of the relatively large area of said portions the legs do not cut into, and hence do not injure, the strip.

I claim as my invention:

1. An attachment for the purpose described comprising a body which is adapted to be positioned between the rear end of the hood of an automobile and an associated part of the latter to support the rear end of the hood at an elevation relative to its normal position and thereby provide a passage through which warm air from the engine of the automobile may be directed against the windshield of the automobile, said body being formed with a forwardly extending finger which is adapted to engage over the rear end of the hood whereby the body may be detachably held in position and a deflector carried by said body and supported thereby against the hood, said deflector providing an extension of the hood beneath which the air is directed toward the windshield.

2. An attachment for the purpose described comprising a U-shaped body which is adapted to be positioned in an inverted position between the rear end of the hood of an automobile and an associated part of the latter to support the rear end of the hood at an elevation relative to its normal position and thereby provide a passage through which warm air from the engine of the automobile may be directed against the windshield of the automobile, the legs of said body being formed with laterally extending feet which are adapted to be arranged upon said associated part and the bridge piece which connects said legs being formed with a finger, said bridge piece and finger slidably engaging opposite sides of the rear end of the hood, whereby the body may be detachably held in position.

GILBERT T. SUGDEN.